United States Patent
Satou (10) Patent No.: US 10,423,189 B2
(45) Date of Patent: Sep. 24, 2019

(54) CONTROL DEVICE OUTPUTTING A TIMING SIGNAL AND ADDITIONAL INFORMATION AND CONTROL SYSTEM INCLUDING THE CONTROL DEVICE

(71) Applicant: FANUC CORPORATION, Minamitsuru-gun, Yamanashi (JP)

(72) Inventor: Kazuhiro Satou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 15/840,648

(22) Filed: Dec. 13, 2017

(65) Prior Publication Data
US 2018/0173272 A1    Jun. 21, 2018

(30) Foreign Application Priority Data
Dec. 15, 2016  (JP) ................................ 2016-243599

(51) Int. Cl.
| | |
|---|---|
| *G06F 1/10* | (2006.01) |
| *G06F 3/05* | (2006.01) |
| *G06F 13/38* | (2006.01) |
| *G06F 1/14* | (2006.01) |
| *G08C 19/00* | (2006.01) |
| *H04Q 9/00* | (2006.01) |

(52) U.S. Cl.
CPC ............... *G06F 1/10* (2013.01); *G06F 1/14* (2013.01); *G06F 13/38* (2013.01); *G08C 19/00* (2013.01); *H04Q 9/00* (2013.01); *H04Q 2209/845* (2013.01)

(58) Field of Classification Search
None
See application file for complete search history.

(56) References Cited

U.S. PATENT DOCUMENTS

| | | | | |
|---|---|---|---|---|
| 5,142,152 A | * | 8/1992 | Boiucaner | G08B 13/187 250/221 |
| 6,243,006 B1 | * | 6/2001 | Rejc | E06B 9/82 160/1 |

(Continued)

FOREIGN PATENT DOCUMENTS

| | | |
|---|---|---|
| CN | 1168593 | 12/1997 |
| CN | 1540291 | 10/2004 |

(Continued)

OTHER PUBLICATIONS

Notice of Reasons for Rejection dated Mar. 6, 2018 in corresponding Japanese Application No. 2016-243599 (with English translation).

*Primary Examiner* — Danny Chan
(74) *Attorney, Agent, or Firm* — Wenderoth, Lind & Ponack, L.L.P.

(57) ABSTRACT

To provide a control device and control system capable of implementing time synchronization of sensor data, even in a case of using a common sensor interface device. A control device that receives information related to sensor values from a sensor interface device includes: a timing signal generation unit that generates a timing signal, an additional information generation unit that generates additional information synchronized with the timing signal, and an output unit that outputs the timing signal and additional information to the sensor interface device.

7 Claims, 5 Drawing Sheets

(56) References Cited

U.S. PATENT DOCUMENTS

| | | | | |
|---|---|---|---|---|
| 6,553,151 | B1* | 4/2003 | Gahang | H04N 1/401 358/461 |
| 1,652,602 | A1 | 1/2010 | Miettinen | |
| 2012/0101776 | A1* | 4/2012 | Brower | B64D 43/00 702/183 |
| 2012/0254878 | A1* | 10/2012 | Nachman | G06F 9/5094 718/102 |
| 2013/0336092 | A1* | 12/2013 | Pennec | G01V 1/22 367/76 |
| 2014/0257729 | A1* | 9/2014 | Wolf | G01D 4/004 702/89 |
| 2015/0035754 | A1* | 2/2015 | Lim | G06F 3/03543 345/166 |
| 2015/0039786 | A1* | 2/2015 | Martin | G06F 13/122 710/8 |
| 2015/0134996 | A1* | 5/2015 | Pitigoi-Aron | G06F 1/329 713/400 |
| 2016/0352388 | A1* | 12/2016 | Lane | H04B 3/54 |
| 2017/0207907 | A1* | 7/2017 | Anvekar | H04L 7/0029 |

FOREIGN PATENT DOCUMENTS

| | | |
|---|---|---|
| CN | 102183944 | 9/2011 |
| JP | 11-341706 | 12/1999 |
| JP | 2001-177583 | 6/2001 |
| JP | 2004-54503 | 2/2004 |
| JP | 2010-16576 | 1/2010 |
| JP | 2014-117328 | 6/2014 |
| JP | 2015-76805 | 4/2015 |
| JP | 2015-513730 | 5/2015 |
| WO | 2006/018935 | 2/2006 |

\* cited by examiner

CONTROL DEVICE OUTPUTTING A TIMING SIGNAL AND ADDITIONAL INFORMATION AND CONTROL SYSTEM INCLUDING THE CONTROL DEVICE

This application is based on and claims the benefit of priority from Japanese Patent Application No. 2016-243599, filed on 15 Dec. 2016, the content of which is incorporated herein by reference.

BACKGROUND OF THE INVENTION

Field of the Invention

The present invention relates to a control device and a control system having a time synchronization function for sensor data.

Related Art

The necessity for analyzing large volumes of sensor data collected from sensors has been rising accompanying the spread of the IoT (Internet of Things) to the manufacturing floor. In order to appropriately analyze collected sensor data, time synchronization among sensor data, and association of sensor data to other information such as the operation mode of equipment is necessary. However, conventional PLC (Programmable Logic Controller) and most conventional equipment (hereinafter this is also referred to as "sensor interface device") to which sensors are connected such as an AD converter (hereinafter this is called "sensor interface device") do not support a common time synchronization function such as that defined by the IEEE 1588 standard, for example.

In this regard, Patent Document 1 discloses technology wherein a sensor interface device samples sensor values synchronously with an external synchronization signal. In addition, Patent Document 2 discloses technology for synchronizing the time between a plurality of sensor nodes performing intermittent actions repeating an active state and suspended state at fixed time intervals.

Patent Document 1: Japanese Unexamined Patent Application, Publication No. 2015-076805
Patent Document 2: Japanese Unexamined Patent Application, Publication No. 2010-016576

SUMMARY OF THE INVENTION

However, with the technologies in the disclosures of Patent Document 1 and Patent Document 2, it is necessary to incorporate a synchronization function into the sensor interface device itself. For this reason, it is necessary to manufacture the sensor interface device itself following a special specification, and the versatility of the sensor interface device may be impaired. In addition, particularly if the number or scale of sensor interface devices increases following a special specification in proportion to the increase in the number of sensors, the cost will become excessive to that extent.

Therefore, the present invention has an object of providing a control device and a control system capable of implementing time synchronization of sensor data, even in a case of using a common sensor interface device.

A first control device according to a first aspect of the present invention is a control device (e.g., the control device 100, 200 described later) that receives information related to sensor data from a sensor interface device (e.g., the sensor interface device 500 described later), the control device including: a timing signal generation unit (e.g., the timing signal generation unit 130 described later) that generates a timing signal; an additional information generation unit (e.g., the additional information generation unit 140 described later) that generates additional information synchronized with the timing signal; and an output unit (e.g., the serial signal output unit 150 described later) that outputs the timing signal and the additional information to the sensor interface device.

According to a second aspect of the present invention, in the control device as described in the first aspect, the output unit may convert the timing signal and the additional information into a serial signal and output the serial signal.

According to a third aspect of the present invention, in the control device as described in the second aspect, the output unit may include a timing signal output unit (e.g., the timing signal output unit 160 described later) that outputs the timing signal; and an additional information output unit (e.g., the additional information output unit 170 described later) that outputs the additional information.

A control system (e.g., the control system 10 described later) according to a fourth aspect of the present invention is a control system including: the control device as described in the first to third aspects (e.g., the control device 100, 200 described later), a sensor interface device (e.g., the sensor interface device 500 described later), and an additional information decoding device (e.g., the additional information decoding device 700 described later), in which the control device may send the timing signal and the additional information to the sensor interface device; the sensor interface device may sample sensor data with the timing signal and the additional information, and send to the additional information decoding device; and the additional information decoding device may receive the sensor data with the timing signal and the additional information from the sensor interface device, and decode the additional information.

According to a fifth aspect of the present invention, in the control system as described in the fourth aspect, the control device (e.g., the control device 100, 200 described later) and the additional information decoding device (e.g., the additional information decoding device 700 described later) may be integrated.

A second control device (e.g., the control device 100, 200 described later) according to a sixth aspect of the present invention is a control device that receives information related to sensor data from a sensor interface device (e.g., the sensor interface device 500 described later), the control device including: a timing signal generation unit (e.g., the timing signal generation unit 130 described later) that generates a timing signal; an additional information generation unit (e.g., the additional information generation unit 140 described later) that generates additional information synchronized with the timing signal; an output unit (e.g., the serial signal output unit 150 described later) that outputs the timing signal and the additional information to the sensor interface device; and an additional information decoding unit (e.g., the additional information decoding unit 180 described later) that decodes the additional information received from the sensor interface device.

According to the present invention, it is possible to implement time synchronization of sensor data, even in a case of using a common sensor interface device.

DETAILED DESCRIPTION OF THE INVENTION

Hereinafter, embodiments of the present invention will be described in detail while referencing FIGS. 1 to 6.

(Outline of Operations)

Figure 1:
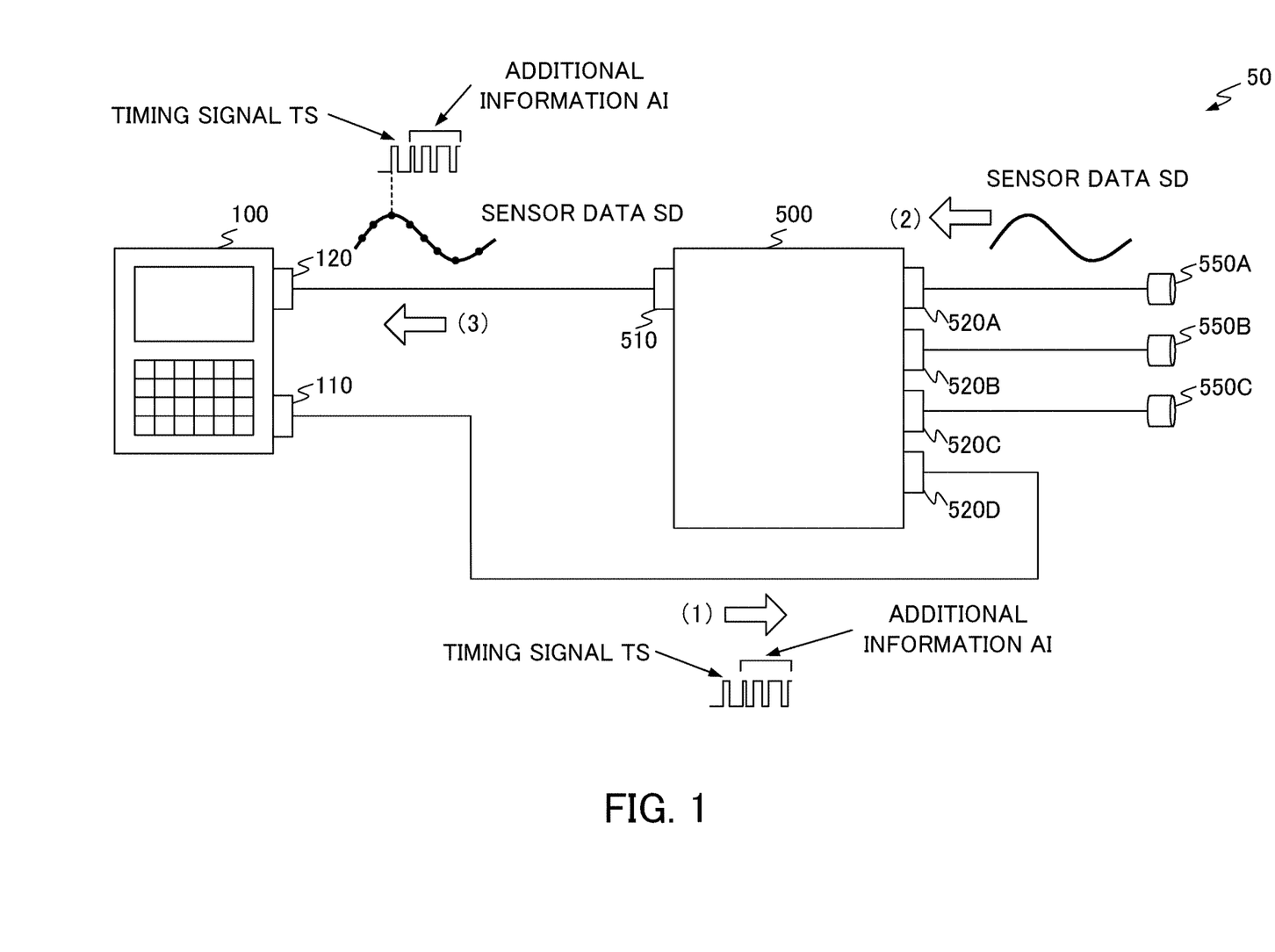
FIG. 1 is a view showing an outline of operations of the present invention.

FIG. 1 shows an outline of operations of an embodiment of the present invention. In FIG. 1, a control system 50 includes a control device 100, sensor interface device 500, and sensors 550A to 550C. In addition, the control device 100 includes an output port 110 and input port 120. The sensor interface device 500 includes an output port 510 and input ports 520A to 520D. The sensor 550A is connected to the input port 520A of the sensor interface device 500, the sensor 550B is connected to the input port 520B, and the sensor 550C is connected to the input port 520C. In addition, the output port 110 of the control device 100 is connected to the input port 520D of the sensor interface device 500. The output port 510 of the sensor interface device 500 is connected to the input port 120 of the control device 100. It should be noted that, although the number of sensors in FIG. 1 is three, the embodiment of the present invention is not to be limited to this.

In the control system 50, first, as shown in (1), the control device 100 outputs a timing signal TS and additional information AI synchronized with the start of the timing signal TS, as a serial signal to the sensor interface device 500. As a result thereof, the timing signal TS and additional information AI from the control device 100 are inputted to any of the plurality of input ports 520A to 520D (input port 520D in the example of FIG. 1) included by the sensor interface device 500.

In (2), the sensor interface device 500 may always do sampling at a constant interval period (1 millisecond, etc.), and may start sampling with the timing signal TS received from the control device 100 as the trigger. In the case of the latter, a fixed number may be sampled at the constant interval periods.

In (3), the control device 100 receives the sensor data SD, timing signal TS and additional information AI from the sensor interface device 500.

The above-mentioned additional information AI can have time information, and/or information related to the operation mode of equipment (during acceleration of main shaft, during constant speed, during deceleration, during cutting, etc.). In addition, the above-mentioned control device 100 may be a numerical control device or robot controller, for example. Furthermore, contrary to FIG. 1, it may receive the sensor data SD and additional information AI by a device separate from the control device 100, e.g., PC or the like, and use the sensor data and additional information in the PC.

FIRST EMBODIMENT

Figure 2:
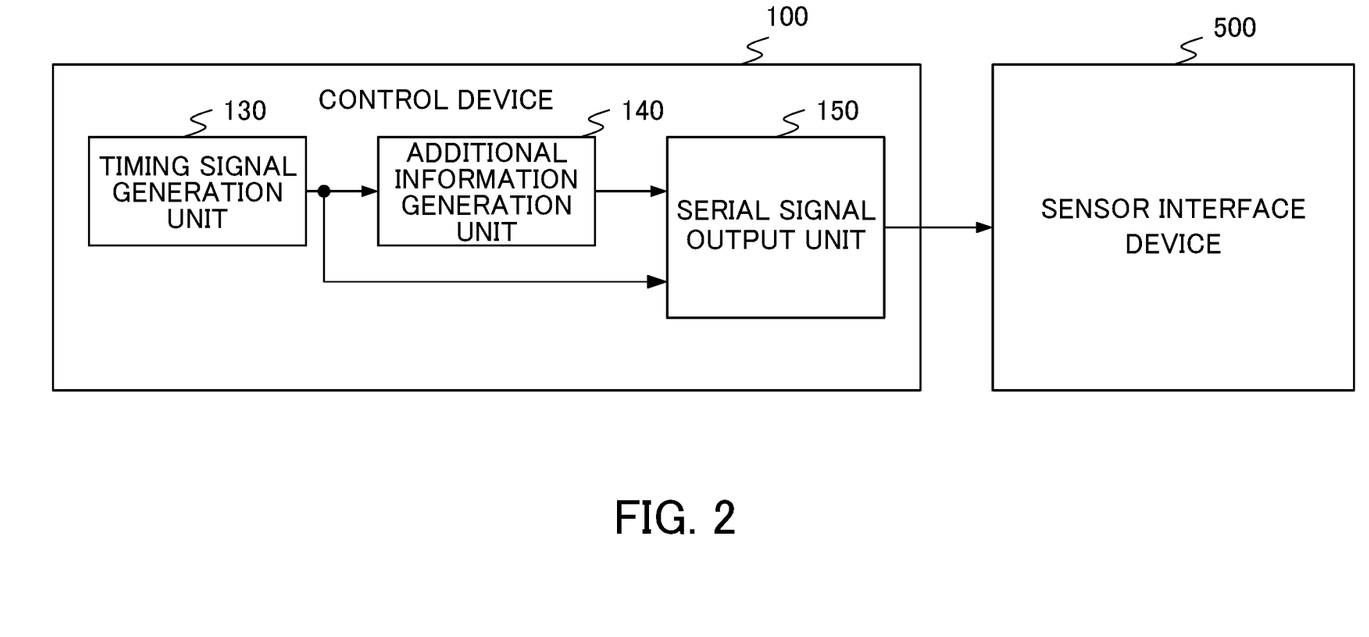
FIG. 2 is a view showing a configuration example for a control device according to a first embodiment of the present invention.

FIG. 2 shows a configuration example of the control device 100 according to the first embodiment. As shown in FIG. 2, the control device 100 includes a timing signal generation unit 130, additional information generation unit 140, and serial signal output unit 150.

The timing signal generation unit 130 is a circuit or software for generating a pulse signal at a fixed time interval, and sends the generated pulse signal to the additional information generation unit 140 and serial signal output unit 150 as a timing signal.

The additional information generation unit 140 generates information such as time information, and sends to the serial signal output unit 150, with the event of receiving the timing signal as a trigger.

The serial signal output unit 150 converts the timing signal received from the timing signal generation unit 130 and the additional information received from the additional information generation unit 140 into a serial signal, and sends to the sensor interface device 500. A configuration example of this serial signal output unit 150 is shown in FIG. 3.

Figure 3:
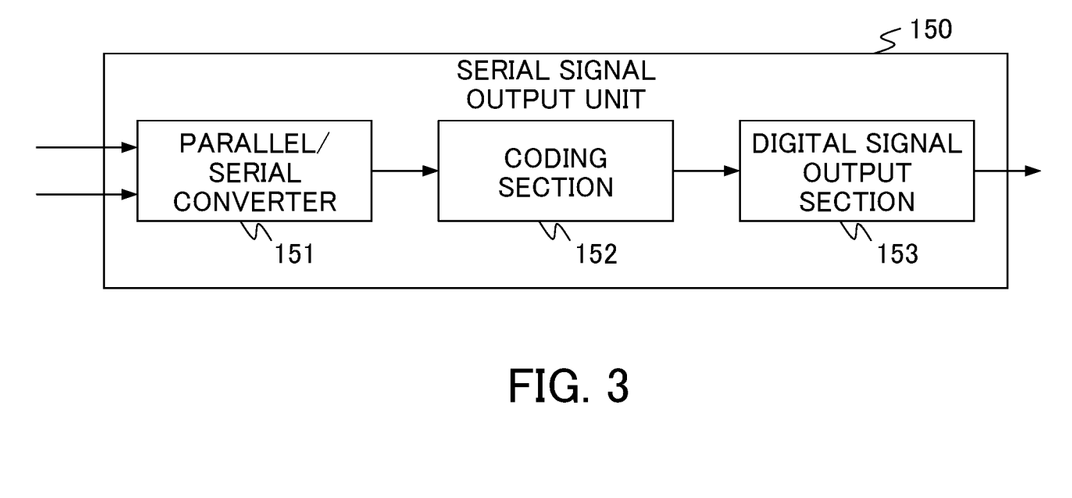
FIG. 3 is a view showing a configuration example for a serial signal output unit according to the first embodiment of the present invention.

As shown in FIG. 3, the serial signal output unit 150 includes a parallel/serial converter 151, a coding section 152, and a digital signal output section 153.

The parallel/serial converter 151 converts the timing signal received from the timing signal generation unit 130 and the additional information received from the additional information generation unit 140 from parallel signals into a serial signal.

The coding section 152 codes the serial signal received from the parallel/serial converter 151. The purpose of coding is to convey the clock information to the data receiving side, and add an error detection and/or correction function to the data, for example.

More specifically, for example, the coding section 152 adds a start bit and stop bit before and after respective data in order to convey clock information to the data receiving side, and adds a parity bit for error detection.

In more detail, in order to achieve bit synchronization, the coding section 152 adds the start bit (e.g., "0") and stop bit (e.g., "1") before and after respective data (e.g., 8-bit data) and sends, while continuously sending a stop bit in the case of text data to send not being present. Before the transmission of respective data starts, "1" of the start bit is consecutively sent; however, when transmission of respective data (may include parity bit) starts, "0" of the start bit is sent. This change from "1"→"0" is always monitored on the data receiving side, and if identifying this change, the data receiving side recognizes that the respective data has been sent. Then, the data receiving side reads information in sequence from a subsequent bit to the start bit, and after reading 8-bit information for the respective data amounts, confirms that the subsequent bit is the stop bit and ends reading of the respective data amounts. On this occasion, the data sending side and data receiving side initially negotiate how many bits to communicate every 1 second, and perform transmission of respective data by synchronizing with each other in the clocks generated oneself, whereby the data sending side and data receiving side "start-stop" at the same cycle.

In the present invention, by using such a start-stop synchronization method, it becomes possible to decode data outputted by the serial signal output section in the additional information decoding device, without requiring to provide a signal line for synchronization. It should be noted that the technology disclosed in Japanese Unexamined Patent Application, Publication No. 2007-123988 can be exemplified as a start-stop synchronization method capable of receiving high-speed bit data, for example.

The digital signal output section 153 outputs (sends) the coded serial signal received from the coding section 152 as a digital signal to the sensor interface device 500.

By having the configuration shown in the above-mentioned FIG. 2 and FIG. 3, the control device 100 outputs the timing signal and the additional information synchronized with the start of the timing signal to the sensor interface device 500 as a serial signal.

Figure 4:
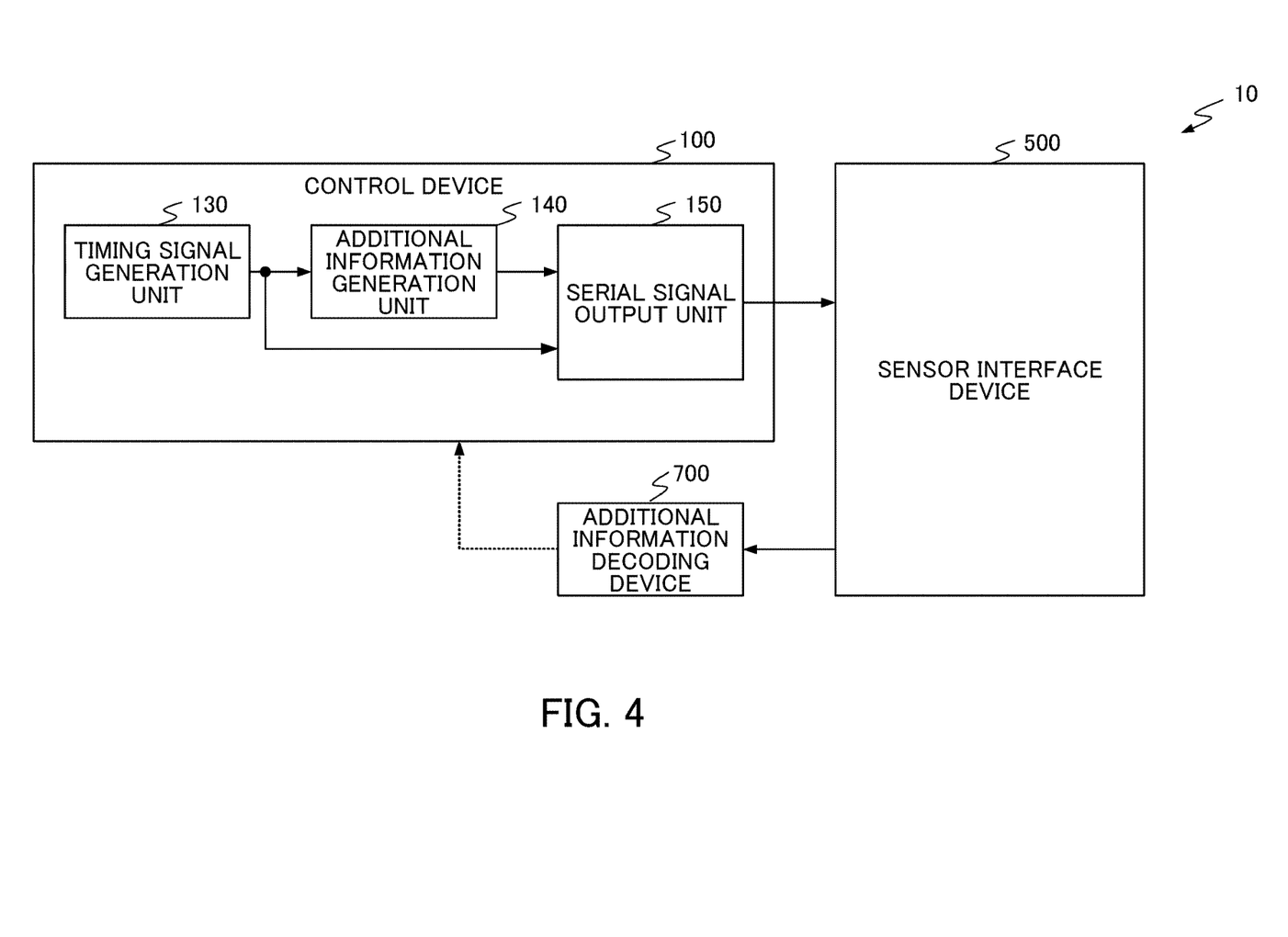
FIG. 4 is a view showing a configuration example for a control system according to the first embodiment of the present invention.

FIG. 4 shows a configuration example of the control system 10 including the above-mentioned control device 100. The control system 10 includes an additional information decoding device 700, in addition to the control device 100 and sensor interface device 500.

As mentioned above, the control device 100 outputs the timing signal and the additional information synchronized with the start of the timing signal to the sensor interface device 500 as a serial signal.

The sensor interface device 500 samples the sensor data and the above-mentioned serial signal, and sends to the additional information decoding device 700. It should be noted that a case of always sampling, and a method for deciding the timing using the timing signal have been considered as the timing for sampling of the sensor interface device 500, for example.

The additional information decoding device 700 performs detection of variation points in the timing signal and decoding of the additional information from the serial signal received from the sensor interface device 500, and associates the decoded additional information and the sensor data at the timing of the variation point of the timing signal. Herein, for the variation point of timing signal, a few cases have been considered such as A) point of timing signal changing from High to Low; B) point of timing signal changing from Low to High; and C) point of series of timing signals changing from idle code to Sync code, for example.

(Effects According to First Embodiment)

By outputting and additional information synchronized with the timing signal using the control device 100 according to the first embodiment, it is possible to add additional information of high synchronism to sensor data of a common sensor interface device, and conduct time synchronization. More specifically, for example, by acquiring the sensor data during a specific operation mode, it is possible to realize failure prediction of a main spindle, etc.

SECOND EMBODIMENT

Figure 5:
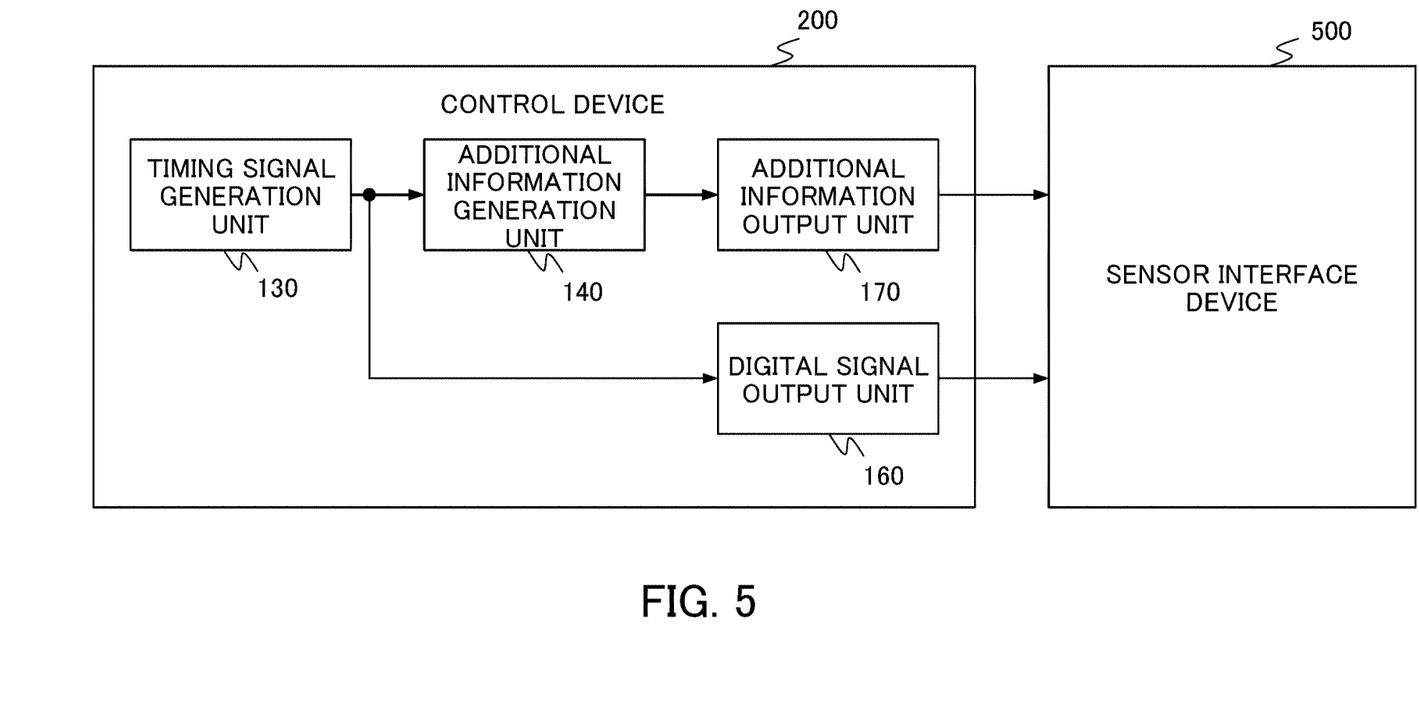
FIG. 5 is a view showing a configuration example for a control device according to a second embodiment of the present invention.

FIG. 5 shows a configuration example of a control device 200 according to a second embodiment. It should be noted that constituent elements that are identical to the control device 100 according to the first embodiment will be illustrated using the same reference symbols, and explanations thereof will be omitted.

The control device 200 includes a timing signal generation unit 130, additional information generation unit 140, timing signal output unit 160, and addition information output unit 170.

In the first embodiment, the timing signal generated by the timing signal generation unit 130, and additional information generated by the additional information generation unit 140 are received by one serial signal output unit 150. On the other hand, in the second embodiment, the timing signal output unit 160 receives the timing signal generated by the timing signal generation unit 130, and sends to the sensor interface device 500. On the other hand, the additional information output unit 170 receives the additional information generated by the additional information generation unit 140, and sends to the sensor interface device 500. In other words, in the control device 200 according to the second embodiment, the timing signal and additional information are sent to the sensor interface device 500 separately.

It should be noted that, although omitted from the drawings, the additional information output unit 170 can include the parallel/serial converter 151, coding section 152 and digital signal output section 153, similarly to the digital signal output unit 150 included by the control device 100 according to the first embodiment.

In addition, although omitted from the drawings, it is possible to configure the control system 20 according to the second embodiment using the sensor interface device 500 and additional information decoding device 700 in addition to the control device 200, similarly to the control system 10 according to the first embodiment.

(Effects of Second Embodiment)

As mentioned above, in the control device 200 according to the second embodiment, the timing signal and additional information are sent to the sensor interface device 500 separately. It is thereby possible to establish a configuration that uses the timing signal as a trigger signal of the sensor interface device 500, and inputs the additional information to an input port of the sensor interface device 500. In addition, similarly to the control device 100 or control system 10 according to the first embodiment, it becomes possible to add additional information of high synchronism to the sensor values of a general sensor interface device, and conduct time synchronization.

MODIFIED EXAMPLE

In the above-mentioned first embodiment, the serial signal output unit 150 has a configuration that converts the timing signal received from the timing signal generation unit 130 and additional information received from the additional information generation unit 140 into a serial signal, and sends to the sensor interface device 500; however, it is not limited thereto. For example, in place of the serial signal output unit 150, it may use an output unit that sends the timing signal and additional information to the sensor interface device 500 as parallel signals, for example, without converting into a serial signal.

In addition, in the above-mentioned first and second embodiments, the serial signal output unit 150, timing signal output unit 160 and additional information output unit 170 are integrated with the control device 100 or 200; however, it is not limited thereto. For example, it may be made a configuration in which these output units are separate units from the control device 100, and connected with the control device 100 or 200 via a communication path. In addition, it may be made a configuration that executes the processing until coding in the control device 100 or 200, and executes digital signal output by a separate unit.

In addition, in the control system 10 or 20 according to the above-mentioned first and second embodiments, the control device 100 or 200 and the additional information decoding device 700 are separate; however, it is not limited thereto. For example, these devices may be integrated, and the functions of these devices may be realized within the same device. In other words, the control device 100 or 200 may further include an additional information decoding unit 180 which realizes the same functions as the additional information decoding device 700.

In addition, in the first and second embodiments, the additional information decoding device 700 may implement functions such as using the decoded additional information in analysis, displaying on a display unit (not illustrated), and transferring to another device such as the control device 100 or a numerical control device and/or robot controller.

Although the first and second embodiments of the present invention have been explained above, the present invention is not to be limited to these embodiments. In addition, the effects described in these embodiments are merely exemplifying the most preferred effects produced from the present invention, and the effects according to the present invention are not to be limited to those described in these embodiments.

The control method according to the control device 100 or 200 is realized by way of software. In the case of being realized by software, the programs constituting this software are installed to a computer (control device 100 or 200). In addition, these programs may be recorded in removable media and distributed to users, or may be distributed by being downloaded to the user's computer via a network. Furthermore, these programs may be provided to the user's computer (control device 100 or 200) as a Web service via a network without being downloaded.

EXPLANATION OF REFERENCE NUMERALS 10, 20, 50 control system
100, 200 control device
130 timing signal generation unit
140 additional information generation unit
150 serial signal output unit
160 timing signal output unit
170 additional information output unit
180 additional information decoding unit
500 sensor interface device
700 additional information decoding device

What is claimed is:

1. A control device that receives information related to sensor data from a sensor interface device to which a plurality of sensors connected to respective Internet of Things (IoT) devices are connected, the control device comprising:
    a timing signal generation unit that generates a timing signal configured to allow for a time synchronization function among sensor data from the plurality of sensors even when the sensor interface is a common interface that is utilized with the plurality of sensors;
    an additional information generation unit that generates additional information synchronized with the timing signal; and
    an output unit that outputs the timing signal and the additional information to the sensor interface device, the timing signal and the additional information being configured so that a time synchronization of sensor data from the plurality of sensors and sampling of sensor data by the plurality of sensors with the timing signal and the additional information is implemented in the sensor interface device;
    wherein the additional information includes information related to an operation mode of equipment of the respective IoT devices associated with sensor data so that sensor data may be acquired during a specific operation mode;
    wherein the sensor interface device samples sensor data with the timing signal and the additional information, and sends the sensor data to an additional information decoding device.

2. The control device according to claim 1, wherein the output unit converts the timing signal and the additional information into a serial signal, and then outputs the serial signal.

3. The control device according to claim 1, wherein the output unit includes a timing signal output unit that outputs the timing signal; and an additional information output unit that outputs the additional information.

4. The control device according to claim 1 further comprising: the additional information decoding unit that decodes the additional information received from the sensor interface device.

5. The control device according to claim 1, further comprising:
    an input unit that receives the sensor data, the timing signal, and the additional information from the sensor interface device.

6. A control system comprising:
    a sensor interface device and an additional information decoding device,
    a control device that receives information related to sensor data from the sensor interface device to which a plurality of sensors connected to respective Internet of Things (IoT) devices are connected, the control device comprising:
        a timing signal generation unit that generates a timing signal configured to allow for a time synchronization function among sensor data from the plurality of sensors even when the sensor interface is a common interface that is utilized with the plurality of sensors;
        an additional information generation unit that generates additional information synchronized with the timing signal; and
        an output unit that outputs the timing signal and the additional information to the sensor interface device, the timing signal and the additional information being configured so that a time synchronization of sensor data from the plurality of sensors and sampling of sensor data by the plurality of sensors with the timing signal and the additional information is implemented in the sensor interface device;
    wherein the additional information includes information related to an operation mode of equipment of the respective IoT devices associated with sensor data so that sensor data may be acquired during a specific operation mode;
    wherein the control device sends the timing signal and the additional information to the sensor interface device,
    wherein the sensor interface device samples sensor data with the timing signal and the additional information, and sends the sensor data to the additional information decoding device, and
    wherein the additional information decoding device receives the sensor data with the timing signal and the additional information from the sensor interface device, and decodes the additional information.

7. The control system according to claim 6, wherein the control device and the additional information decoding device are integrated.

* * * * *